(12) United States Patent
Carter (10) Patent No.: US 6,851,545 B1
(45) Date of Patent: Feb. 8, 2005

(54) UVC CONVEYOR BELT SYSTEM

(75) Inventor: Thomas Eric Carter, Maplewood, NJ (US)

(73) Assignee: Caddy Corporation, Bridgeport, NJ (US)

(*) Notice: Subject to any disclaimer, the term of this patent is extended or adjusted under 35 U.S.C. 154(b) by 0 days.

(21) Appl. No.: 10/807,082

(22) Filed: Mar. 23, 2004

(51) Int. Cl.[7] ............................................. B65G 45/10
(52) U.S. Cl. ......................................................... 198/494
(58) Field of Search ................................. 198/493, 494; 250/453.11, 455.11

(56) References Cited

U.S. PATENT DOCUMENTS

| | | | | |
|---|---|---|---|---|
| 2,575,426 A | * | 11/1951 | Parnell | 426/241 |
| 3,583,132 A | | 6/1971 | Doyen | 53/180 |
| 3,826,014 A | | 7/1974 | Helding | 34/1 |
| 3,914,594 A | | 10/1975 | Helding | 240/41.35 |
| 4,143,278 A | | 3/1979 | Koch, II | 250/527 |
| 4,414,913 A | | 11/1983 | Sarda | 118/46 |
| 4,643,911 A | | 2/1987 | Inoue et al. | 427/54.1 |
| 5,052,548 A | | 10/1991 | Andrews | 198/817 |
| 5,225,170 A | | 7/1993 | Kolk et al. | 422/186.3 |
| 5,228,210 A | | 7/1993 | Hofmuth et al. | 34/18 |
| 5,463,938 A | * | 11/1995 | Sarukawa et al. | 99/352 |
| 5,784,679 A | | 7/1998 | Schlueter, Jr. et al. | 399/335 |
| 6,028,315 A | | 2/2000 | Bailey et al. | 250/455.11 |
| 6,233,841 B1 | | 5/2001 | Beach | 34/262 |
| 6,238,275 B1 | | 5/2001 | Metcalf et al. | 451/87 |
| 6,305,284 B1 | | 10/2001 | Watanabe et al. | 101/463.1 |
| 6,386,091 B2 | * | 5/2002 | Iwata et al. | 99/330 |
| 6,710,357 B1 | * | 3/2004 | Schweitzer | 250/492.1 |

* cited by examiner

Primary Examiner—Eileen D. Lillis
Assistant Examiner—Mark A. Deuble
(74) Attorney, Agent, or Firm—Fitzpatrick, Cella, Harper & Scinto (57) ABSTRACT

The conveyor system includes a conveyor bed mounted on a frame and an endless conveyor belt moving between upper and lower flight pads relative to the conveyor bed. A separate drive unit for the belts includes an enclosed housing having an opening therein through which the conveyor bed passes. The housing contains a belt drive mechanism including a plurality of belt pulleys engaged with the belt for receiving the conveyor belt from one of the upper and lower flight pads, applying motor power to the belt, and returning it to the other of the flight pads. The enclosure also includes a UV irradiation light source interposed in the path of travel of the belt through the housing for disinfecting the surfaces of the belt and the interior of the housing as the belt passes therethrough.

18 Claims, 7 Drawing Sheets

UVC CONVEYOR BELT SYSTEM

BACKGROUND OF THE INVENTION

1. Field of the Invention

The present invention relates to conveyor systems, and more particularly to a conveyor system using a continuous conveyor belt particularly adapted for the food service industry for transporting food trays and the like, including an ultraviolet irradiation system for disinfecting the conveyor belts at a position remote from the portion of the conveyor used to convey food products.

2. Background of the Invention

In hospitals and other institutions which have a centralized food preparation location, meals are often prepared along a conveyor belt carrying food trays across a series of stations at which appropriate meal portions, dishes or beverages are placed on the conveyor. Such conveyors typically have a straight flight path with an endless belt supported on pulleys defining the path. The belt typically will run in an upper flight path on which the trays are carried, and a lower flight path below a conveyor bed. The lower flight path is either exposed to whatever is below that flight path, or is contained within a support plate to try to prevent contamination of food products or the like that may be moved below the conveyor.

Because of the continuous operation of these belts in a large room where various food products are handled, it is possible for the conveyor belts to become contaminated with food products, bacteria or the like. Typically, in the past, such conveyors were periodically taken out of operation and sanitized using soaps and decontaminating chemicals. This is a time consuming and expensive process. To overcome that, it has been proposed in the past to devote a section of the conveyor's surface path of travel to passage through a hooded housing containing a plurality of UVC lights to expose the belt to irradiation from the lights for disinfection. Such previously proposed UV disinfection systems take up a substantial amount of space on the useful conveyor surface, and may require food products on the conveyor belt to pass through the UV light housing itself.

In addition, access to the belt in these housings is difficult and the housing size will vary depending on belt speeds. Thus, for example, the faster the belt speed the longer the housing must be in order to properly decontaminate the belt.

Some of the problems associated with prior art conveyor belts for the food service industry have been overcome by the conveyor system disclosed in U.S. Pat. No. 5,052,548, the disclosure of which is incorporated herein by reference.

As disclosed in that patent, the conveyor system is used for transporting food trays, soiled trays and the like. The system includes a frame which defines a conveyor path of travel of relatively great length, and typically having one or more horizontal curves or turns therein. A pair of corresponding conveyor beds are mounted on the frame and define upper flight paths to move the food trays or soiled trays thereon. In food preparation, a plurality of work stations are positioned along one side edge of each of the conveyor beds. A different item, such as food or beverage or their associative condiments are placed on the trays at each of the work stations. In soiled tray systems, soiled dishes are transported from the cafeteria to the ware-washing area.

The conveyor belt disclosed in U.S. Pat. No. 5,052,548 includes a pair of endless belts mounted in the frame for movement along a conveyor path of travel between corresponding upper and lower return flight paths. The drive mechanism of this system allows the return belt path to be positioned above the conveyor bed. The belts are constrained within a box channel on their lower return flight paths remote from the work stations, thereby to maintain a sanitary environment for food tray preparation or soiled trays.

Despite the advantages of that system, it is still possible for the conveyor belts to be contaminated with excess food products or bacteria, viruses or the like. While a conventional UV hood arrangement over the conveyor path of these belts would serve to partially decontaminate the belts, it would not be possible to decontaminate all sides of the belts using that system because both sides of the belts are not exposed in the conveyor flight path. Moreover, as with conventional systems, the UV hood arrangement would take up excess space in the useful conveyor flight path. Therefore, conventional UV systems would not be satisfactory for use with this type of conveyor system.

OBJECTIVE OF THE INVENTION

It is an object of the present invention to provide an improved food service conveyor system with a self-contained UV disinfection system.

Another object of the invention is to provide an ultraviolet irradiation system for a food service conveyor system which exposes all sides of the conveyor to UV irradiation.

Yet another object of the invention is to provide a food service system with an ultraviolet irradiation system which is relatively simple in construction and easy to manufacture.

A further object of the present invention is to provide a food service conveyor system with a self-contained irradiation unit within an enclosure surrounding the drive path section of the conveyor's path of travel.

BRIEF SUMMARY OF THE INVENTION

In accordance with an aspect of the present invention, a food service conveyor is provided which includes a frame, a conveyor bed mounted on the frame, and at least one endless conveyor belt moving between upper and lower flight portions. A belt drive unit is provided to supply motive power to the belt, and includes an enclosed housing having an opening therein through which the belt passes. The housing further includes a drive mechanism for the belt consisting of a motor and a plurality of belt pulleys engaged with the belt. The pulleys guide the conveyor belt from one of the upper and lower flight paths to the drive motor, which applies motive power to the belt and then returns it to the other of the flight paths.

A UV-C irradiation lamp is positioned in the belt drive housing interposed in the portion of the path of travel of the belt or belts through the housing. In one embodiment of the invention, multiple light sources are positioned in the housing relative to the path of travel of the belts so that all surfaces of the belts are exposed to irradiation, along with the entire interior of the housing as the belts pass therethrough. In addition, the housing may contain a separation panel which will isolate the conveyor belts from the drive mechanism and other structures contained in the housing to avoid contamination of the belts by those structures.

The drive housing is also provided with an access opening and a door or panel for selectively opening and closing the housing. A safety switch is provided for deactivating the UV lights when the door is opened or the panel removed.

The light sources used in the present invention are similar in shape to tubular fluorescent light bulbs, but produce ultraviolet light. Such light sources or lamps produce UV-C irradiation at a wavelength of about 254 nm, with an intensity of about 142 $\mu$w/cm$^2$. Preferably, the lights are positioned, as noted above, between the belts within the housing so as to expose all sides thereof. The path of travel of the belts in the drive mechanism, and the number of lights, can be varied so that without changing the size of the housing, there is sufficient an exposure time within the housing to adequately disinfect the belts. Accordingly, the system of the present invention is able to disinfect the belts and the interior of the drive housing in which the belts travel and inactivate common bacteria found in hospital and other institutional air, such as *escherichia coli, pseudomonas, fluoresces, serrapia marcescen, Micrococcus, luteus* and *bacillus subtilis*.

The above, and other objects, features and advantages of this invention will be apparent in the following detailed description of illustrative embodiments thereof, which is to be read in connection with the accompanying drawings, wherein:

DETAILED DESCRIPTION OF PREFERRED EMBODIMENTS

Figure 1:
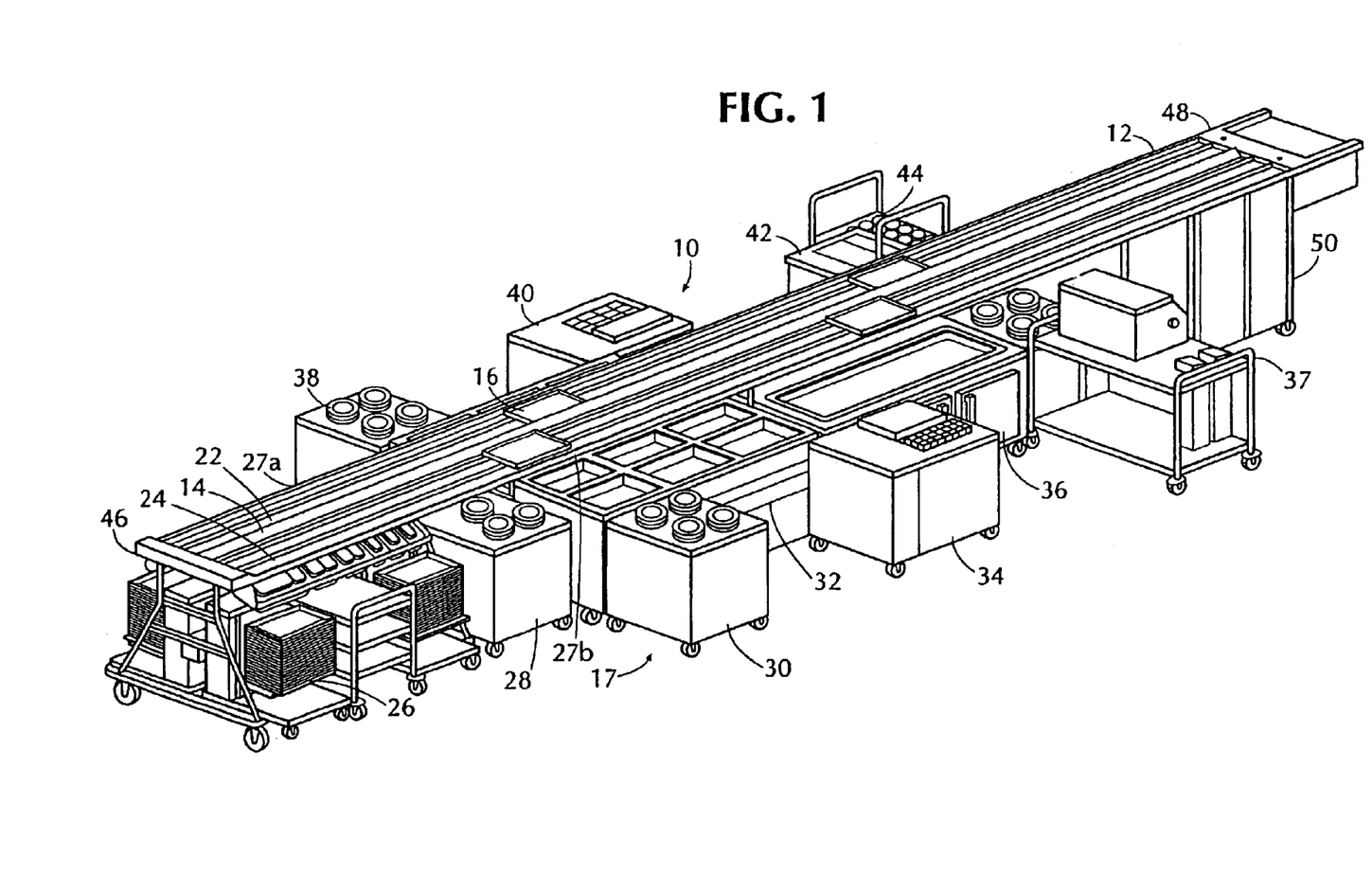
FIG. 1 is a front perspective view of a conveyor system constructed in accordance with the present invention.
Figure 2:
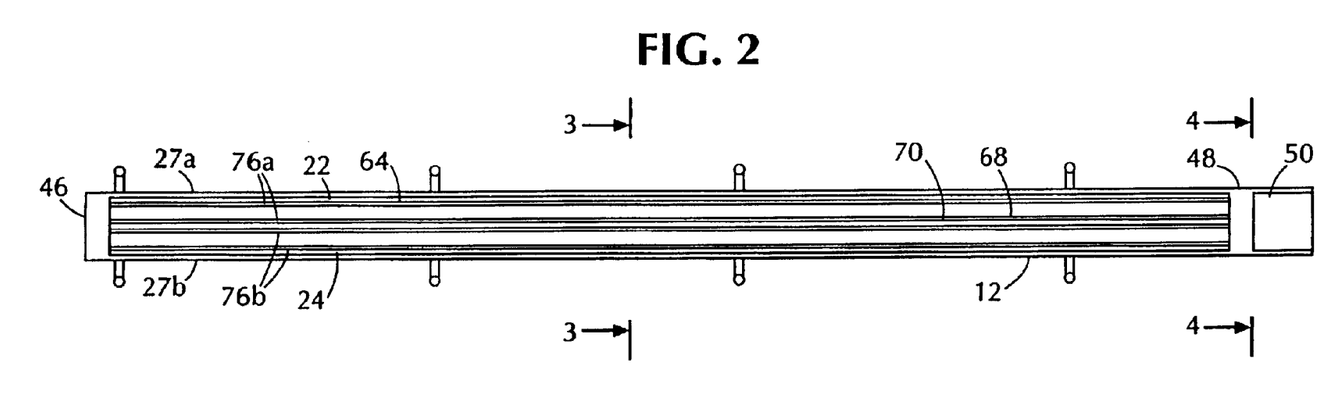
FIG. 2 is a top plan view of an embodiment of a conveyor frame adapted to be used in the conveyor system of FIG. 1.

Referring now to the drawings in detail, and initially to FIG. 1 thereof, a conveyor system 10 constructed in accordance with the present invention includes a frame 12 (typically formed of stainless steel) that defines a conveyor path of travel 14. The path of travel is of substantial length such as is used in the food service industry to transport food trays 16, soiled trays, or the like, between different work stations. Although the illustrative embodiment relates to food service conveyor systems, the invention is readily adaptable to other objects, particularly objects which may cause undesirable contamination of the conveyor itself.

Figure 3:
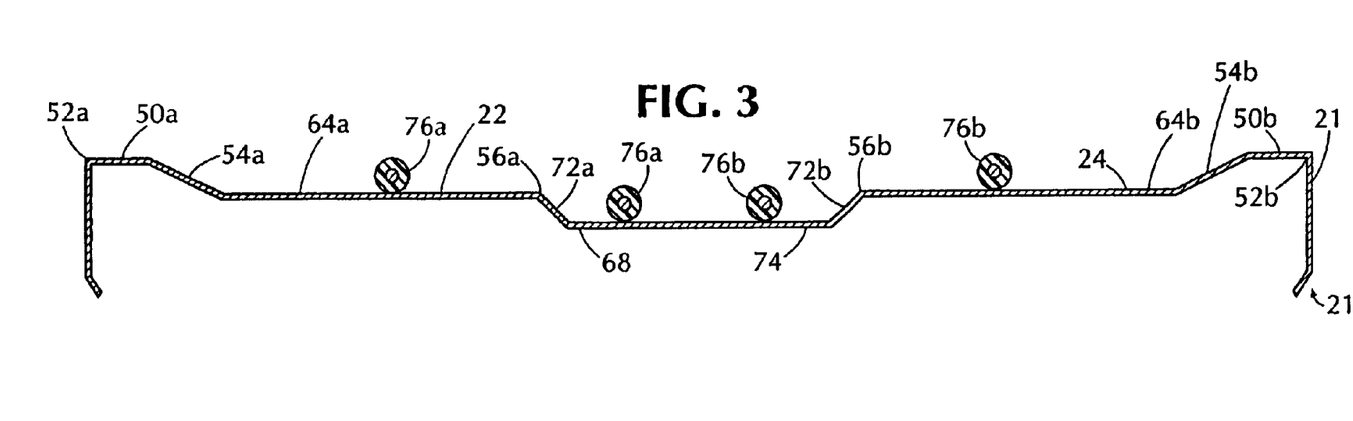
FIG. 3 is a partial cross-sectional view taken along line 3—3 of FIG. 2.

As seen in FIG. 3, the conveyor frame 12 includes a conveyor bed panel 21 which is made of stainless steel and shaped to provide two conveyor beds 22, 24 along which the conveyor elements, described hereinafter, move.

As seen in FIG. 1, a plurality of work stations 17 are provided adjacent to the longitudinal side edges 27a, 27b, of conveyor bed 21. In food preparation, at each work station a different food or beverage container or food item is placed on each tray as it moves along the conveyor bed. For soiled tray systems, soiled dishes are transported, for example, from the cafeteria area to a ware-washing area.

In a food tray preparation system as shown, the work station 17 may include a heated plate dispenser 38, an ice-cream dispenser 40, a coffee urn stand 42, and a mug dispenser 44. At the forward end 46 of the conveyor there could be a tray dispenser 26, a heated underliner dispenser 28, a second heated plate dispenser 30, a food unit 32, a beverage dispenser 34, a cold food unit 36, and a toaster caddy 37. In some cases, in order to conserve space, portions of the work stations are positioned underneath the conveyor bed 21.

Referring again to FIG. 3, it is seen that the conveyor bed sections 22, 24 define the upper flight paths 64a, 64b for the conveyor elements 76a, 76b. In the illustrative embodiment, the trays 16 sit on these portions of these two conveyor elements in those upper flight paths and are moved thereby as the conveyor passes along the conveyor bed.

As seen in FIG. 1, the trays move along each conveyor bed from the front end 46 thereof to the discharge or drive end 48. The tray sides are constrained within the conveyor bed by the retention surfaces 54a and 54b formed therein. The inner edges 56a, 56b of the conveyor bed sections 22, 24 are joined to a central box channel 68, which receives the lower or return flight paths of the conveyors elements 76a, 76b.

As seen in FIG. 3, central box channel 68 is located below the edges 56a, 56b of the conveyor beds, and define a trough which constrains the conveyor belts 76a, 76b during their lower return flight paths.

The conveyor belts 76a, 76b move between their corresponding upper and lower return flight paths, as seen in FIG. 3, in the manner described in U.S. Pat. No. 5,052,548. Preferably, these belts are circular in cross section, and have approximately a ½ inch diameter, being made of flexible polymeric material. In contrast to conventional chain link conveyor belts, the round belts of the present invention are conveniently removable from the conveyor system and, because they have no corners, are advantageous for food handling systems and trays which are not resistant to substantial wear.

Figure 5:
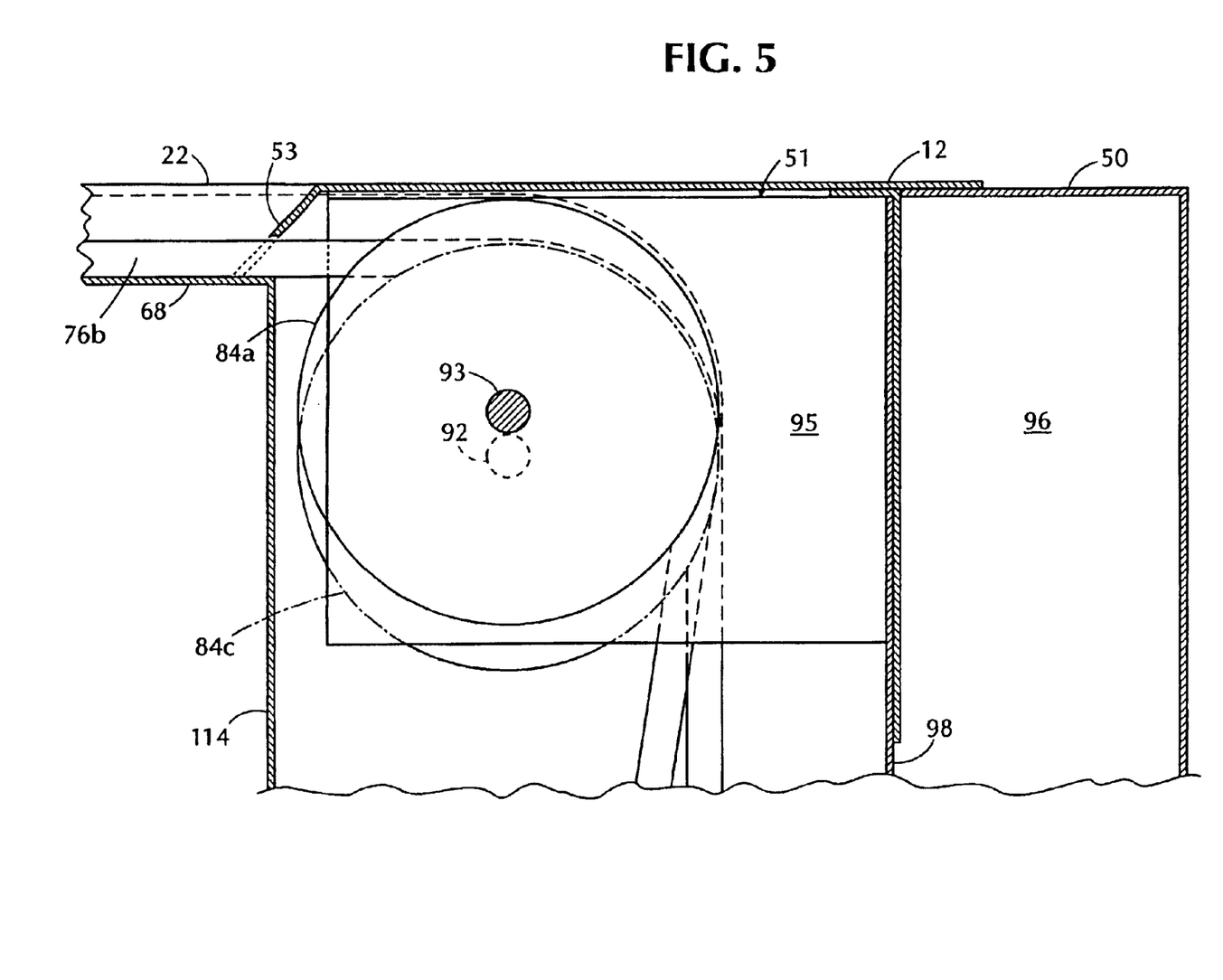
FIG. 5 is a side view taken along lines 5—5 of FIG. 4.
Figure 6:
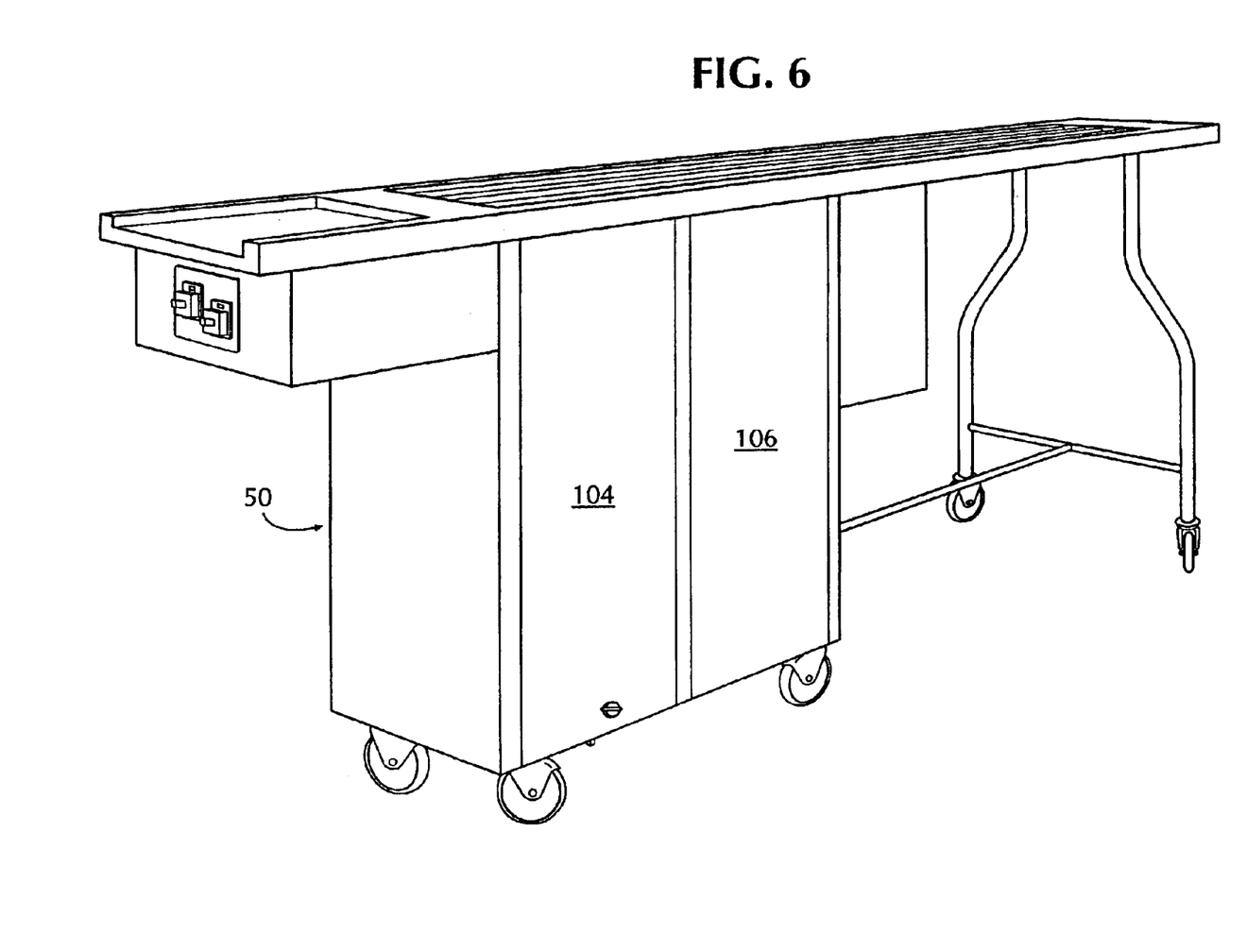
FIG. 6 is a side perspective view of the drive unit and a portion of the conveyor bed shown in FIG. 1.

At the drive end 48 of the conveyor bed, as seen in FIG. 1, the trays are removed from the conveyor bed as the belts pass into a drive enclosure 50 through openings formed in the slanted wall 53 formed in the conveyor bed at the end 48 thereof (See FIG. 5). The housing contains a belt drive arrangement or transmission which applies motive power to the belt and returns it to the conveyor bed for return along the lower flight path of the central box channel 68.

The pulley system which guides the conveyor belts 76 between their flight paths is described in detail in U.S. Pat. No. 5,052,548, and that description need not be repeated herein. However, FIGS. 4 and 5 do show the pulley and drive arrangement in the drive enclosure or cabinet 50. Included therein is a set of drive pulleys 84 and a belt drive unit 85 mounted in the base of the enclosure or housing 50. The pulleys 84 are generally in vertical parallel alignment and positioned just below the top 51 of the housing. Apertures or ports formed in the surface 53 allow the belts to pass through the conveyor bed into the interior of the housing to limit contamination entering into the enclosure. The outer pulleys 84a and 84b receive the belts 76a and 76b respectively from the upper flight path of the conveyor, and direct the belts to another set of pulleys 87a and 87b of the belt drive unit 85. Belts 76a and 76b are then directed upwardly through the inner pulleys 84c and 84d, which in turn direct the belts to the lower return flight path 70 of the box channel 68 towards the pulley arrangement at the front end 46 of the conveyor flight path.

As seen in FIG. 5, the central axis 93 of the outer pulleys 84a and 84b is mounted to be slightly higher than the central axis 92 of the inner drive pulleys 84c and 84d so that the portions of the belt from the upper flights received by the outer drive pulleys of the portions of the belts returning to the lower flights by the inner drive pulleys will enter the box channel 64 and be located, as seen in FIG. 3, at a lower level than the upper flight portions 76a and 76b.

Figure 4:
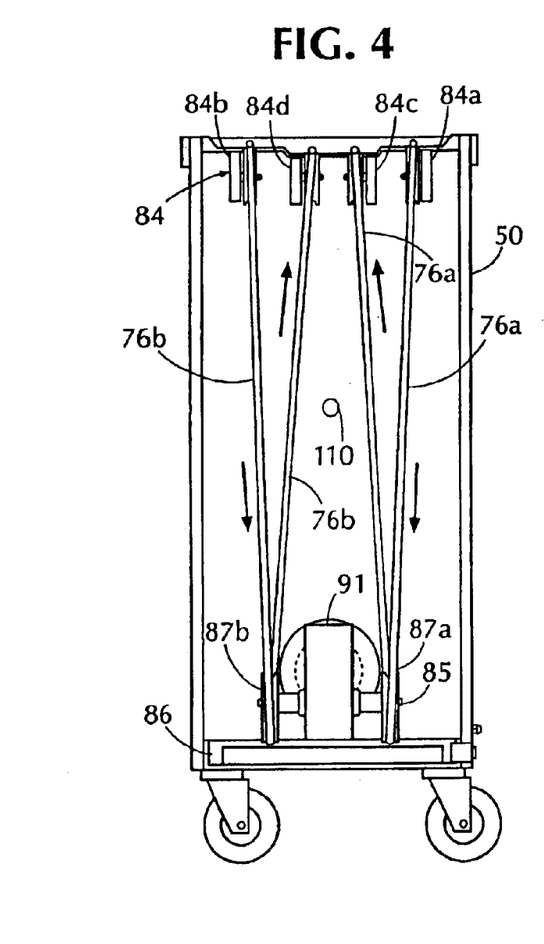
FIG. 4 is a front elevational view taken along line 4—4 of FIG. 2 showing the interior of the conveyor bed drive path.
Figure 7:
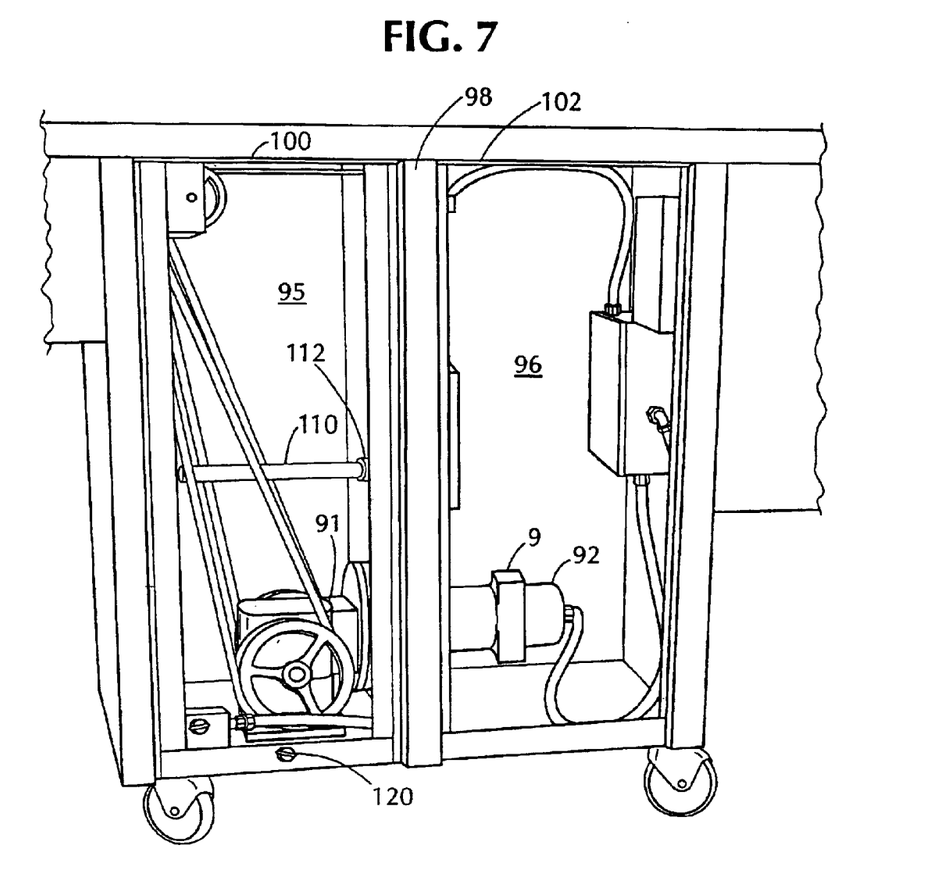
FIG. 7 is a side elevational view with the doors removed to expose the interior of the drive mechanism.

As seen in FIGS. 4 and 7, the pulleys 87a and 87b are connected to a speed reducer 91 which is connected between the pulleys 85 and a DC electric motor 92 to drive the conveyor belts.

As noted above, the conveyor drive path of travel, illustrated in FIG. 4, is contained within a housing 50. This housing is divided into two sections 95, 96. As seen in FIGS. 5 and 7, the section 95 contains the pulleys 84, 85, 87, the conveyor drive flight portions of the belts, and the speed reducer 91. It is separated from the section 96 by a partition 98. The section 96 contains the electric motor 92 and electrical service connections for the system.

The side walls of enclosure 50 have openings 100, 102 formed therein, which are closed by pivotally mounted doors or removable panels 104, 106, respectively. These panels provide selective access to the interior of the housing 50 for servicing. They are pivotally or removably mounted in any known or convenient manner. This arrangement gives the operator the option of independently accessing each of the chambers 95, 96, while at the same time keeping the chamber 96 free of contamination from the conveyor belts and free from exposure to the UV lights.

In accordance with the present invention, an ultraviolet light source 110 is provided within the chamber 95. This light source in the embodiment of the invention illustrated in FIGS. 4 and 7 is a single UV-C irradiation lamp, similar to a fluorescent lamp. The lamp may be of the type which can be mounted only at one end by a conventional socket 112 supported on the central panel 98, or it can be of the type having two ends, each of which is separately supported on an electrical socket mounted on the central panel 98 and the front wall 114 of the housing 50.

Figure 8:
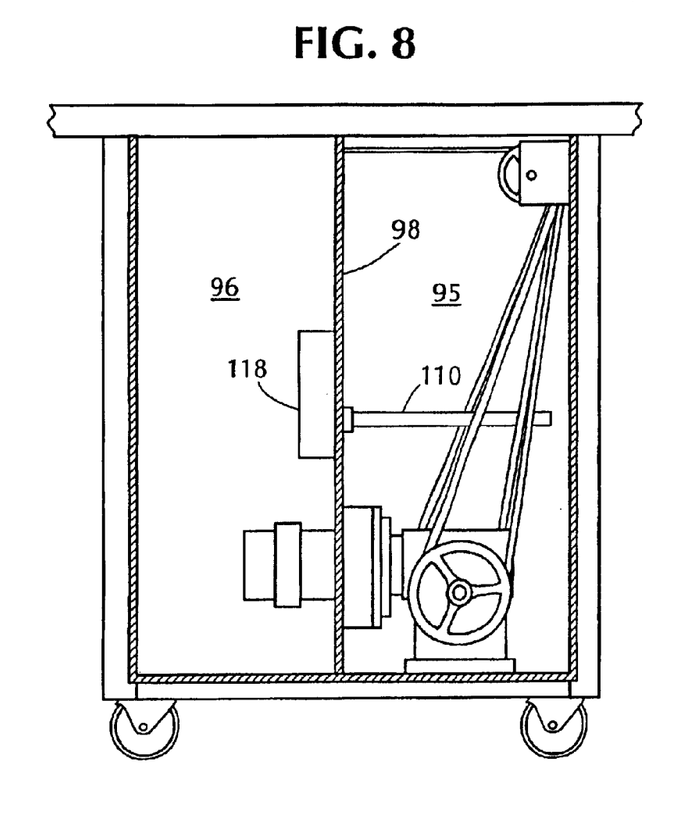
FIG. 8 is a side view, in section, of the interior of the drive housing.

As seen in FIG. 8, a power pack and ballast 118 may be mounted on the panel 98 within the chamber 96, again for servicing.

Figure 10:
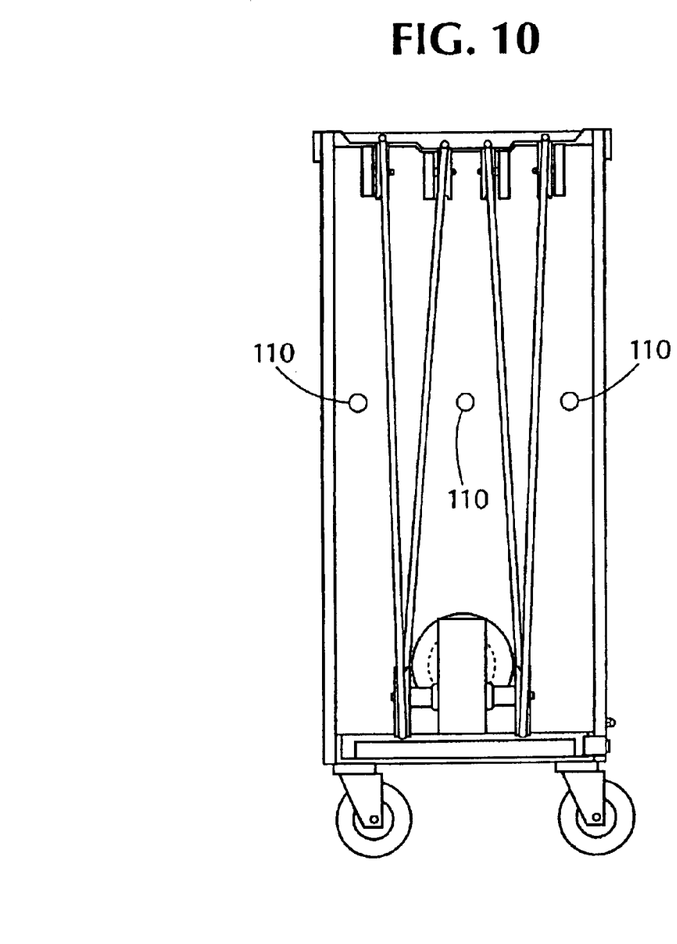
FIG. 10 is a view similar to FIG. 4, showing another embodiment of the invention using a plurality of UV light sources.

In another embodiment of the present invention, illustrated in FIG. 10, three UV-C lighting elements 110 may be provided, as illustrated. In this embodiment, all surfaces of the belts 76 are exposed to irradiation from the lamps 110 to insure complete disinfection thereof. The lamps simultaneously disinfect the air contained within the space 95. Constructing the enclosure as described, access to the motor chamber 96 of the enclosure can be had by opening its associated door or doors while the conveyor is operating without having the chamber or the individuals working within the chamber exposed to the UV light.

Figure 9:
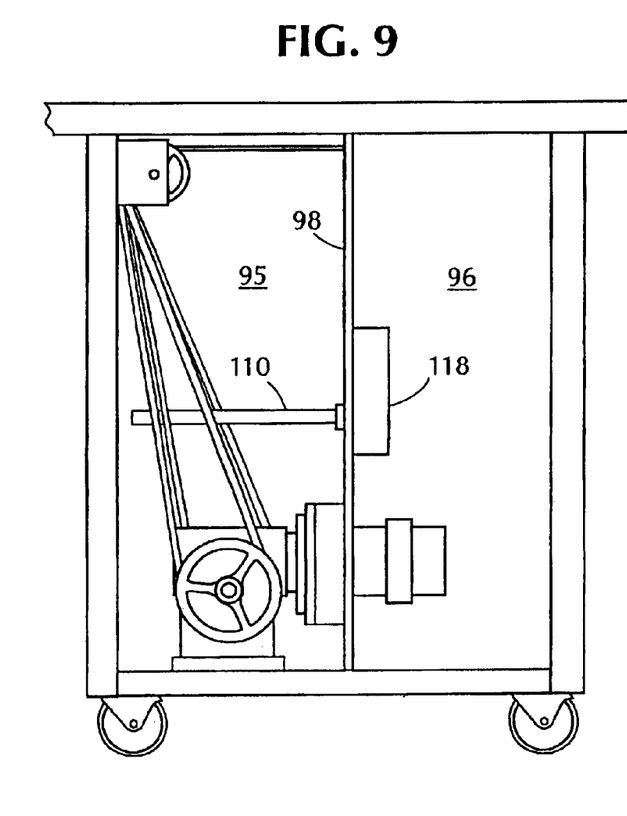
FIG. 9 is a side view, with the doors removed, of the side of the drive unit seen in FIG. 7.

On the other hand, chamber 95 is provided with a contact switch 120, as illustrated in FIGS. 7 and 9, so that when the panels covering the openings to that chamber are opened or removed, the lamps will automatically be shut off. Likewise, when the panels are reinstalled or the doors closed, the contact switch is closed so that the lamps are illuminated, providing electrical power is supplied to the system. Moreover, the construction of the enclosure with the compartment and the entry panel 53 described above, essentially conceals the UV lighting from any line of sight.

While the present invention has been particularly shown and described with reference to the preferred embodiments, it is understood that various changes and modifications may be affected therein by those skilled in the art without departing from the scope or spirit of the invention.

What is claimed is:

1. A conveyor system comprising a frame, a conveyor bed mounted on the frame, an endless conveyor belt moving between upper and lower flight paths relative to said conveyor bed, and a belt drive unit including an enclosed housing having an opening therein through which said belt passes and containing belt drive means and a plurality of belt pulleys engaged with said belt and said drive means for receiving said conveyor belt from one of said upper and lower flight paths, applying motive power to the belt and returning it to the other of said flight paths, and UV irradiation light source interposed in the path of travel of the belt through said housing for disinfecting the belt and the interior of the housing as the belt passes therethrough.

2. A conveyor system as defined in claim 1 wherein said housing has an access opening therein and a door for selectively opening and closing the housing.

3. A conveyor system as defined in claim 2 including safety switch means for deactivating the UV light source when said door is opened.

4. A conveyor system as defined in claim 3 wherein said safety switch activates the UV light source when the door is closed.

5. A conveyor system as defined in claim 4 wherein said safety switch activates the LV light source only when the door is closed and the drive unit is operated.

6. A conveyor system as defined in claim 3 wherein said drive unit is an electric motor and said housing includes a panel dividing the housing to a first compartment containing said UV light source and a second compartment containing said motor.

7. A conveyor system as defined in claim 3 wherein said UV light source includes a plurality of UV light bulbs.

8. A conveyor system as defined in claim 7 wherein said conveyor belt is made of a flexible polymeric material generally cylindrical in cross section.

9. A conveyor system as defined in claim 7 wherein said conveyor belt is formed of a pair of flexible polymeric material generally cylindrical in cross section.

10. A conveyor system comprising a frame, a conveyor bed on said frame defining a conveyor path, a pair of endless conveyor belts respectively movably mounted on said frame for movement along generally parallel paths of travel between upper and lower flight path portions relative to said conveyor bed and a conveyor drive path position remote from said conveyor path; and a belt drive unit including an enclosed drive housing having an opening through which said belts pass to and from their upper and lower flight path portions to the conveyor drive path portion, belt drive means in said enclosure and located away from said upper and lower flight path portions, and a plurality of belt pulleys in said housing engaged with said belts and said drive means to guide the belts between said drive means and said upper and lower flight paths along said conveyor drive path at an angle to said upper and lower flight paths while the drive means applies motive power to said belts, and at least one UV irradiation light source interposed adjacent said conveyor drive path portions of said conveyor belts for disinfecting the belts and the interior of the housing as the belts pass through said conveyor drive path portions.

11. A conveyor system as defined in claim 10 wherein said housing has an access opening therein and a door for selectively opening and closing the housing.

12. A conveyor system as defined in claim 11 including safety switch means for deactivating the UV light source when said door is opened.

13. A conveyor system as defined in claim 12 wherein said safety switch activates the UV light source when the door is closed.

14. A conveyor system as defined in claim 13 wherein said safety switch activates the UV light source only when the door is closed and the drive unit is operated.

15. A conveyor system as defined in claim 11 wherein said drive unit is an electric motor and said housing includes a panel dividing the housing to a first compartment containing said UV light source and a second compartment containing said motor.

16. A conveyor system as defined in claim 15 wherein said UV light source includes a plurality of UV light bulbs.

17. A conveyor system as defined in claim 1 wherein said conveyor belts are made of a flexible material generally cylindrical in cross section.

18. A conveyor system as defined in claim 17 wherein said light sources are arranged in said housing such that they are diametrically opposed on opposite sides of the conveyor drive path portions of the conveyor belts, whereby all surfaces of such belts are irradiated by UV light.

* * * * *